United States Patent
Komatsu et al.

(10) Patent No.: US 9,576,370 B2
(45) Date of Patent: Feb. 21, 2017

(54) DISTANCE MEASUREMENT APPARATUS, IMAGING APPARATUS, DISTANCE MEASUREMENT METHOD AND PROGRAM

(71) Applicant: CANON KABUSHIKI KAISHA, Tokyo (JP)

(72) Inventors: Satoru Komatsu, Yokohama (JP); Keiichiro Ishihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 14/617,972

(22) Filed: Feb. 10, 2015

(65) Prior Publication Data

US 2015/0235103 A1    Aug. 20, 2015

(30) Foreign Application Priority Data

Feb. 17, 2014 (JP) ................................. 2014-027625

(51) Int. Cl.
*G06K 9/00* (2006.01)
*G06T 7/00* (2006.01)

(52) U.S. Cl.
CPC ... *G06T 7/0075* (2013.01); *G06T 2207/10024* (2013.01)

(58) Field of Classification Search
CPC ................... G06T 7/0075; G06T 2207/10024
USPC .............. 382/170, 171, 198, 209, 218, 278, 106,382/190, 206, 282, 286, 291; 358/537, 538, 358/452, 453
See application file for complete search history.

(56) References Cited

U.S. PATENT DOCUMENTS

| | | | | |
|---|---|---|---|---|
| 7,409,092 B2 * | 8/2008 | Srinivasa | ............. | G06K 9/3241 382/103 |
| 7,697,750 B2 * | 4/2010 | Simmons | ................. | G02C 7/16 345/419 |
| 7,853,046 B2 * | 12/2010 | Sharony | ................. | A01K 29/00 356/603 |
| 8,085,302 B2 * | 12/2011 | Zhang | ............. | G08B 13/19667 348/143 |
| 8,368,766 B2 * | 2/2013 | Zhou | ..................... | G06T 3/4038 348/208.14 |
| 8,525,899 B2 * | 9/2013 | Imai | ....................... | H04N 9/735 348/222.1 |

(Continued)

FOREIGN PATENT DOCUMENTS

JP    2008-310418 A    12/2008
JP    2013-044844 A    3/2013

*Primary Examiner* — Yosef Kassa
(74) *Attorney, Agent, or Firm* — Fitzpatrick, Cella, Harper & Scinto

(57) ABSTRACT

A distance measurement method for calculating distance information from a first image and a second image that are image-captured with different image-capturing parameters. A setting step sets a first local region located in the first image including a distance calculation target pixel, and a second local region located in the second image corresponding to the first local region. An extraction step extracts a plurality of shift regions, which are regions of which a shift amount from the second local region is within a predetermined range. A correlation value is calculated between the first local region and each of the plurality of shift regions. A decision step determines a correlation value used for calculating distance information, based on the plurality of correlation values calculated in the first calculation step. The distance information on the distance calculation target pixel is calculated, based on the correlation value determined in the decision step.

29 Claims, 10 Drawing Sheets

(56) References Cited

U.S. PATENT DOCUMENTS

| | | | |
|---|---|---|---|
| 8,723,982 B2 * | 5/2014 | Yanagita | ............ H04N 1/56 348/222.1 |
| 2014/0210999 A1 | 7/2014 | Komatsu | |
| 2015/0042839 A1 | 2/2015 | Komatsu et al. | |

* cited by examiner

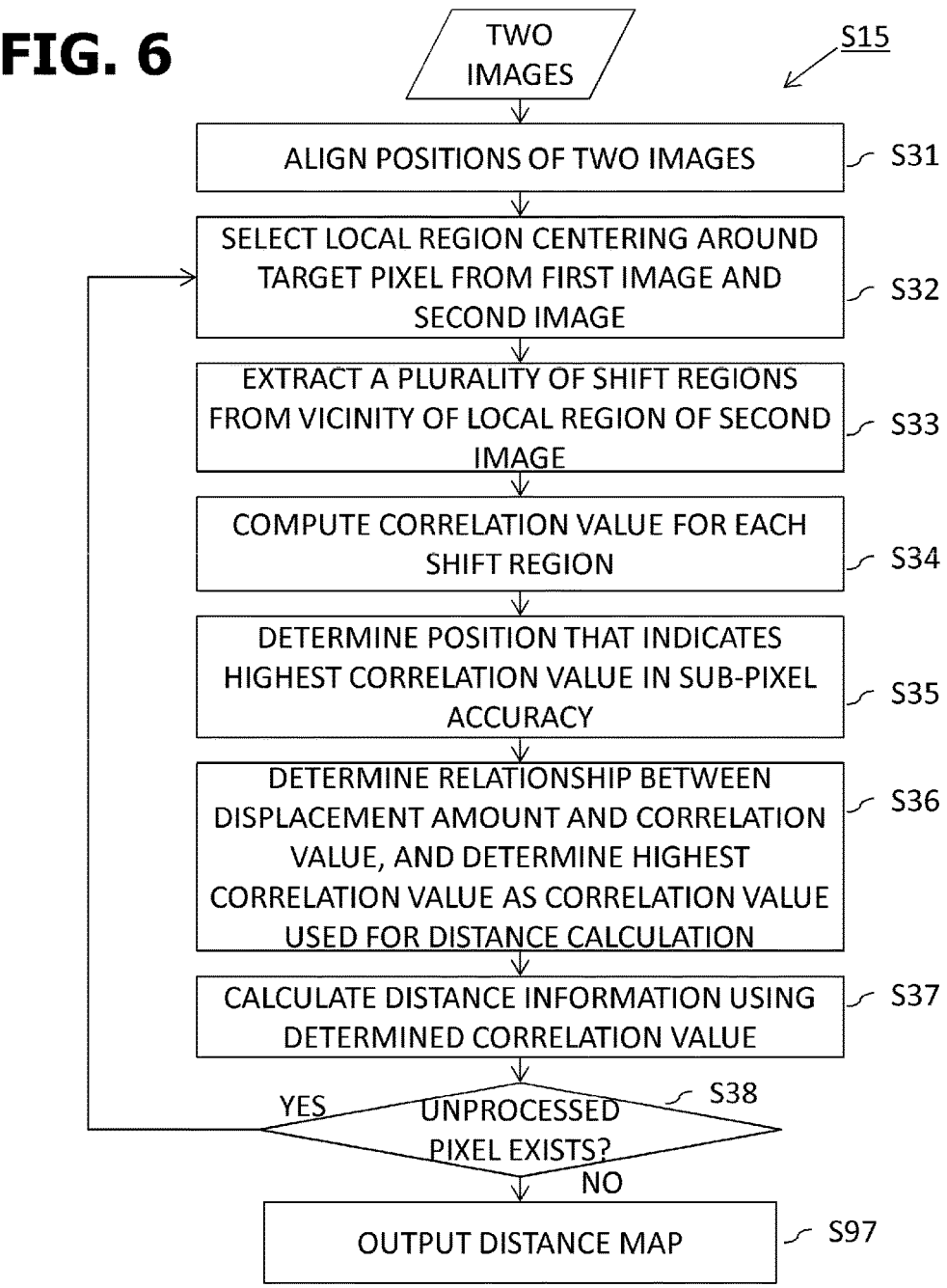

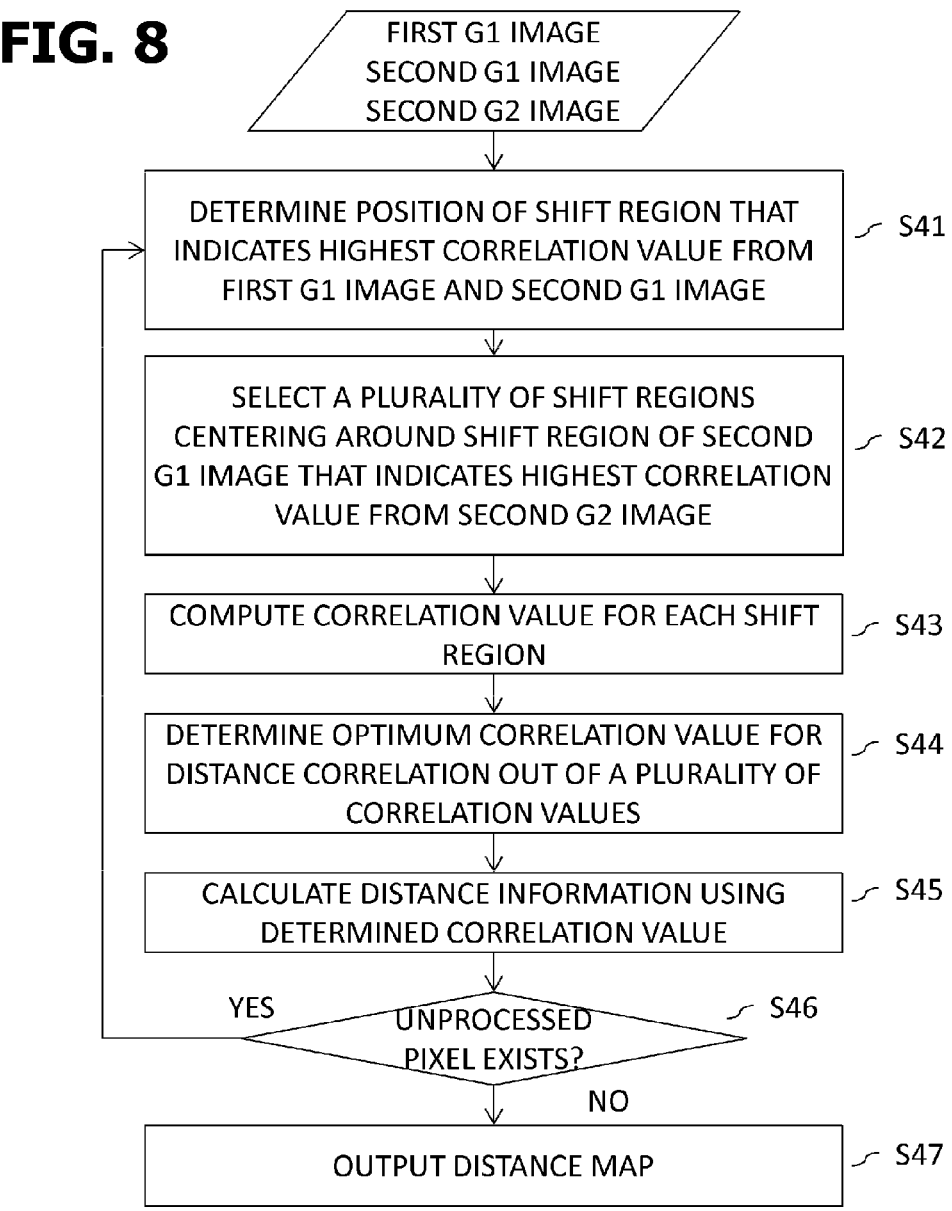

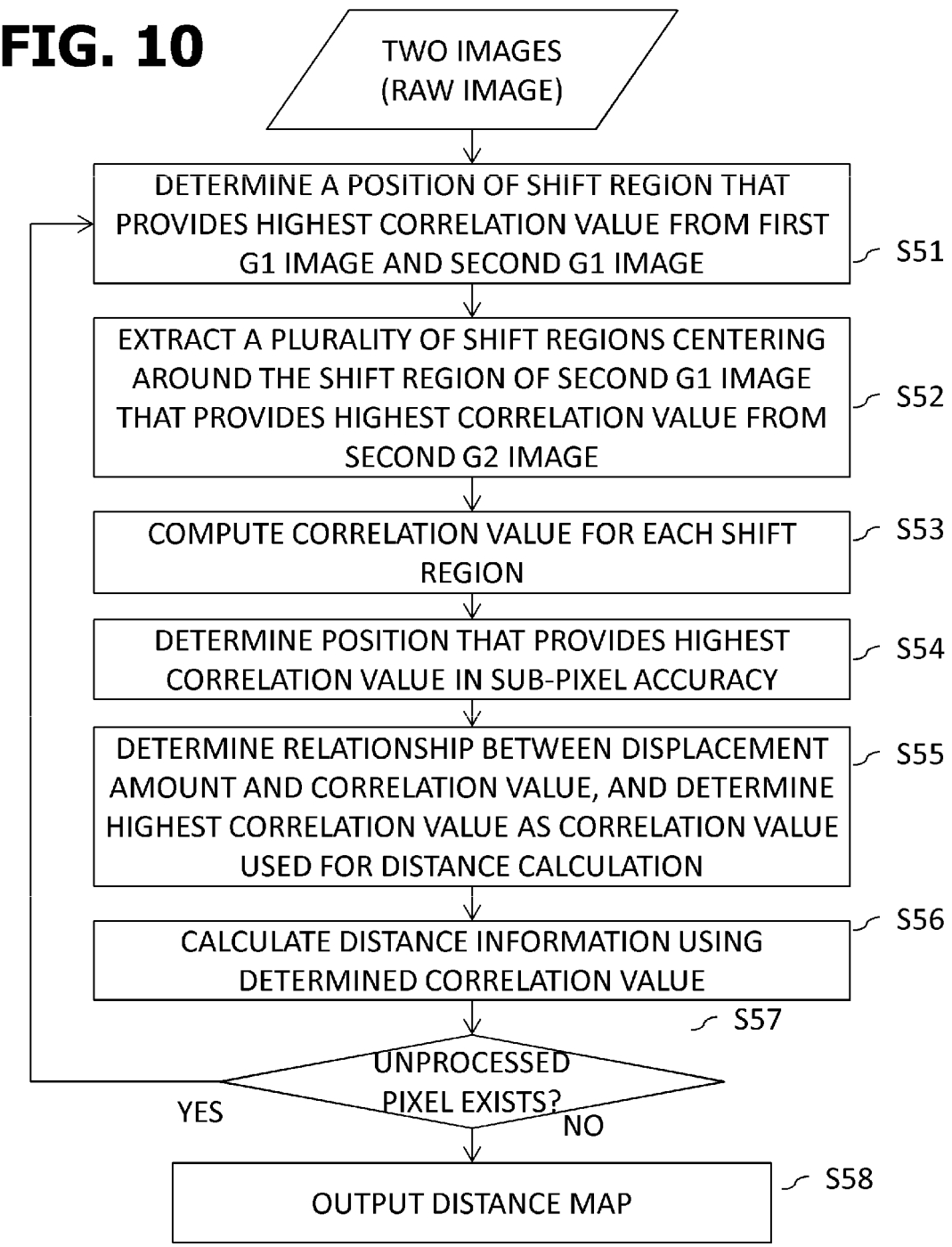

DISTANCE MEASUREMENT APPARATUS, IMAGING APPARATUS, DISTANCE MEASUREMENT METHOD AND PROGRAM

CLAIM OF PRIORITY

This application claims the benefit of Japanese Patent Application No. 2014-027625, filed on Feb. 17, 2014, which is hereby incorporated by reference herein in its entirety.

BACKGROUND OF THE INVENTION

Field of the Invention

The present invention relates to a distance measurement technique, and, more particularly, to a technique to measure distance information from a plurality of images image-captured with different image-capturing parameters.

Description of the Related Art

As a technique to acquire distance of an image-capturing scene from an image acquired by an imaging apparatus, the depth from defocus (DFD) method, disclosed in Japanese Patent Application Laid-open No. 2013-044844, has been proposed. According to the DFD method, a plurality of images having a different degree of blur is acquired by controlling the image-capturing parameters of an imaging optical system, and the degree of blur and the correlation amount of the acquired plurality of images are calculated using the measurement target pixel and its peripheral pixels in the plurality of images.

Since the degree of blur and correlation amount change depending on the distance of an object in the image, the distance can be calculated using this relationship. An advantage of the distance measurement by the DFD method is that incorporation with commercially available imaging apparatuses is possible because distance can be calculated by one imaging system.

Even if an object is image-captured at high-speed with changing of the image-capturing parameters during image-capturing, displacement is generated among the plurality of images due to camera shake, object motion, or the like, which drops the distance measurement accuracy of the DFD method. To prevent positional displacement, the positions of the images are aligned before executing the DFD method. Known methods to align positions are, for example, a block matching method disclosed in Japanese Patent Application Laid-open No. 2013-044844, and a method using an affine transformation disclosed in Japanese Patent Application Laid-open No. 2008-310418.

SUMMARY OF THE INVENTION

A problem of aligning positions in pixel units using the block matching method according to Japanese Patent Application Laid-open No. 2013-044844 is that the computing load increases and the processing time becomes long.

A concern of the position alignment method based on the affine transformation according to Japanese Patent Application Laid-open No. 2008-310418 is that the position alignment accuracy may disperse depending on the distance and the object motion. If distance is calculated based on the DFD method using the images aligned by this method, an accurate distance cannot be determined for a region of which position alignment accuracy is low.

With the foregoing in view, it is an object of the present invention to enable highly accurate distance measurement when distance information is measured from a plurality of images image-captured with different image-capturing parameters, even if positional displacement remains among the plurality of images.

The first aspect of the present invention is a distance measurement apparatus that calculates distance information from a first image and a second image that are image-captured with different image-capturing parameters, the distance measurement apparatus comprising a setting unit configured to set a first local region located in the first image and including a distance calculation target pixel, and a second local region located in the second image and corresponding to the first local region, an extraction unit configured to extract a plurality of shift regions, which are regions of which shift amount from the second local region is within a predetermined range, a first calculation unit configured to calculate a correlation value between the first local region and each of the plurality of shift regions, a first decision unit configured to determine a correlation value used for calculating the distance information, based on the plurality of correlation values calculated by the first calculation unit, and a second calculation unit configured to calculate the distance information on the distance calculation target pixel, based on the correlation value determined by the first decision unit.

The second aspect of the present invention is a distance measurement method for calculating distance information from a first image and a second image that are image-captured with different image-capturing parameters, the method comprising a setting step of setting a first local region located in the first image including a distance calculation target pixel, and a second local region located in the second image corresponding to the first local region, an extraction step of extracting a plurality of shift regions, which are regions of which shift amount from the second local region is within a predetermined range, a first calculation step of calculating a correlation value between the first local region and each of the plurality of shift regions, a decision step of determining a correlation value used for calculating distance information, based on the plurality of correlation values calculated in the first calculation step, and a second calculation step of calculating the distance information on the distance calculation target pixel, based on the correlation value determined in the decision step.

According to the present invention, highly accurate distance measurement is enabled even if positional displacement remains among the images used for the distance measurment.

Further features of the present invention will become apparent from the following description of exemplary embodiments with reference to the attached drawings.

BRIEF DESCRIPTION OF THE DRAWINGS

FIG. 6 is a flow chart depicting a distance map generation processing according to Embodiment 2;

FIG. 8 is a flow chart depicting a distance map generation processing according to Embodiment 3;

FIG. 10 is a flow chart depicting a distance map generation processing according to Embodiment 4.

DESCRIPTION OF THE EMBODIMENTS

Embodiment 1

<System Configuration>

Figure 1:
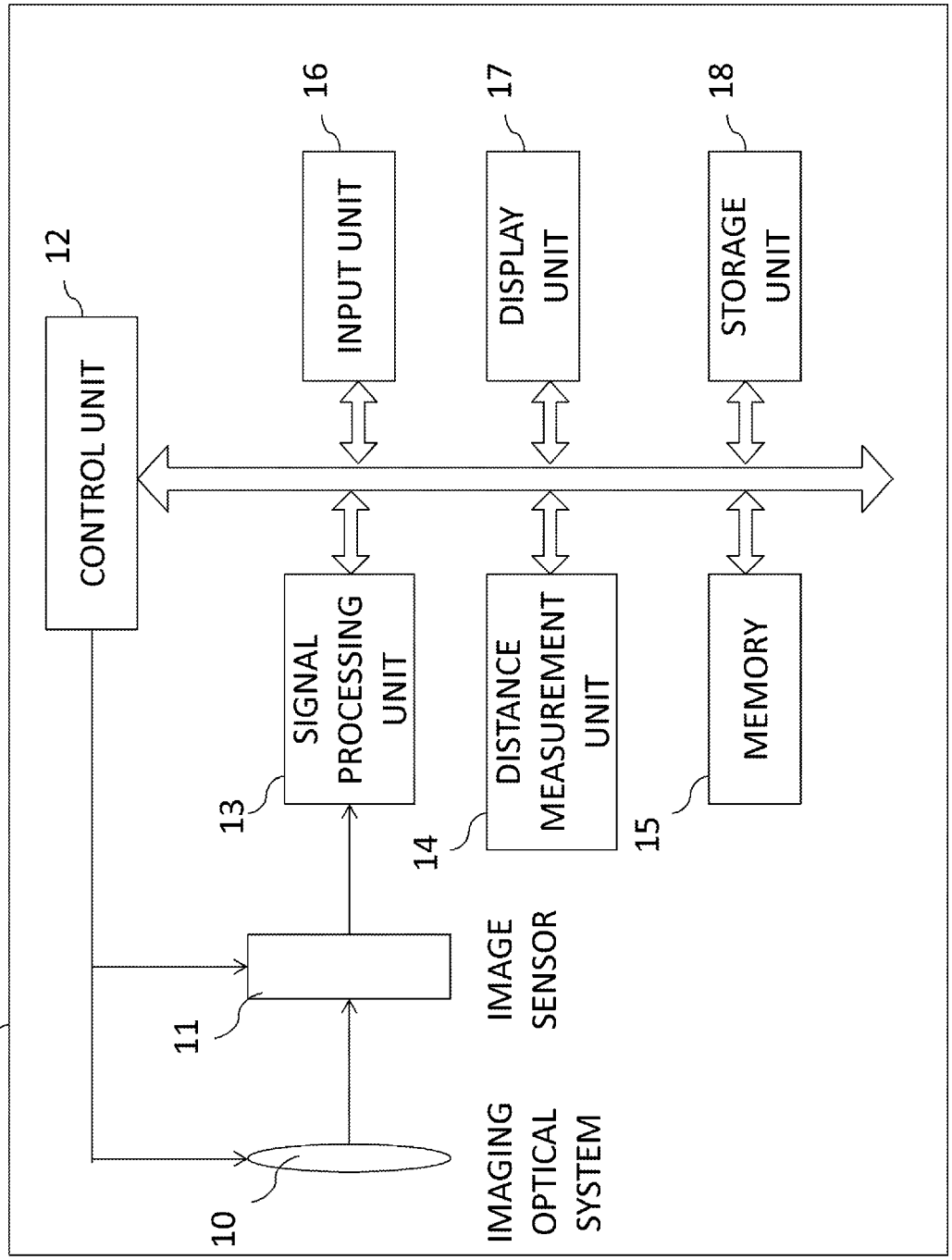
FIG. 1 is a diagram depicting a configuration of an imaging apparatus according to an embodiment.

FIG. 1 is a system block diagram depicting an imaging apparatus according to Embodiment 1 of the present invention. The imaging apparatus 1 includes an imaging optical system 10, an image sensor 11, a control unit 12, a signal processing unit 13, a distance measurement unit 14, a memory 15, an input unit 16, a display unit 17, and a storage unit 18.

The imaging optical system 10 is an optical system that is constituted by a plurality of lenses, and forms an image of entered light on an image plane of the image sensor 11. In this embodiment, a variable-focus optical system is used as the imaging optical system 10, and auto focusing is possible because of the auto focus function of the control unit 12. Auto focusing can be a passive type or an active type.

The image sensor 11 is a picture element having a photoelectric conversion element, such as a CCD and a CMOS. The image sensor 11 may be a picture element having a color filter, or a monochrome picture element, or a three-CCD or three-CMOS type picture element.

The control unit 12 has functions to control each component of the imaging apparatus 1. The functions of the control unit 12 include, for example, auto focusing using auto focus (AF), changing focus position, changing F value (diaphragm), loading images, controlling shutter and flash (not illustrated), and controlling the input unit 16, the display unit 17, and the storage unit 18.

The signal processing unit 13 is a unit for processing signals outputted from the image sensor 11. In concrete terms, the signal processing unit 13 performs A/D conversion of an analog signal, noise removal, de-mosaicing, brightness signal transformation, aberration correction, white balance adjustment, color correction, or positional alignment of images, for example. For the alignment of images, a method of performing coordinate transformation (affine transformation) on one of the images can be used. The digital image data outputted from the signal processing unit 13 is temporarily stored in the memory 15, and is then outputted to the display unit 17 for displaying, to the storage unit 18 for recording (saving), and to the distance measurement unit 14, or the like, and desired processing is performed in each unit.

Figure 2:
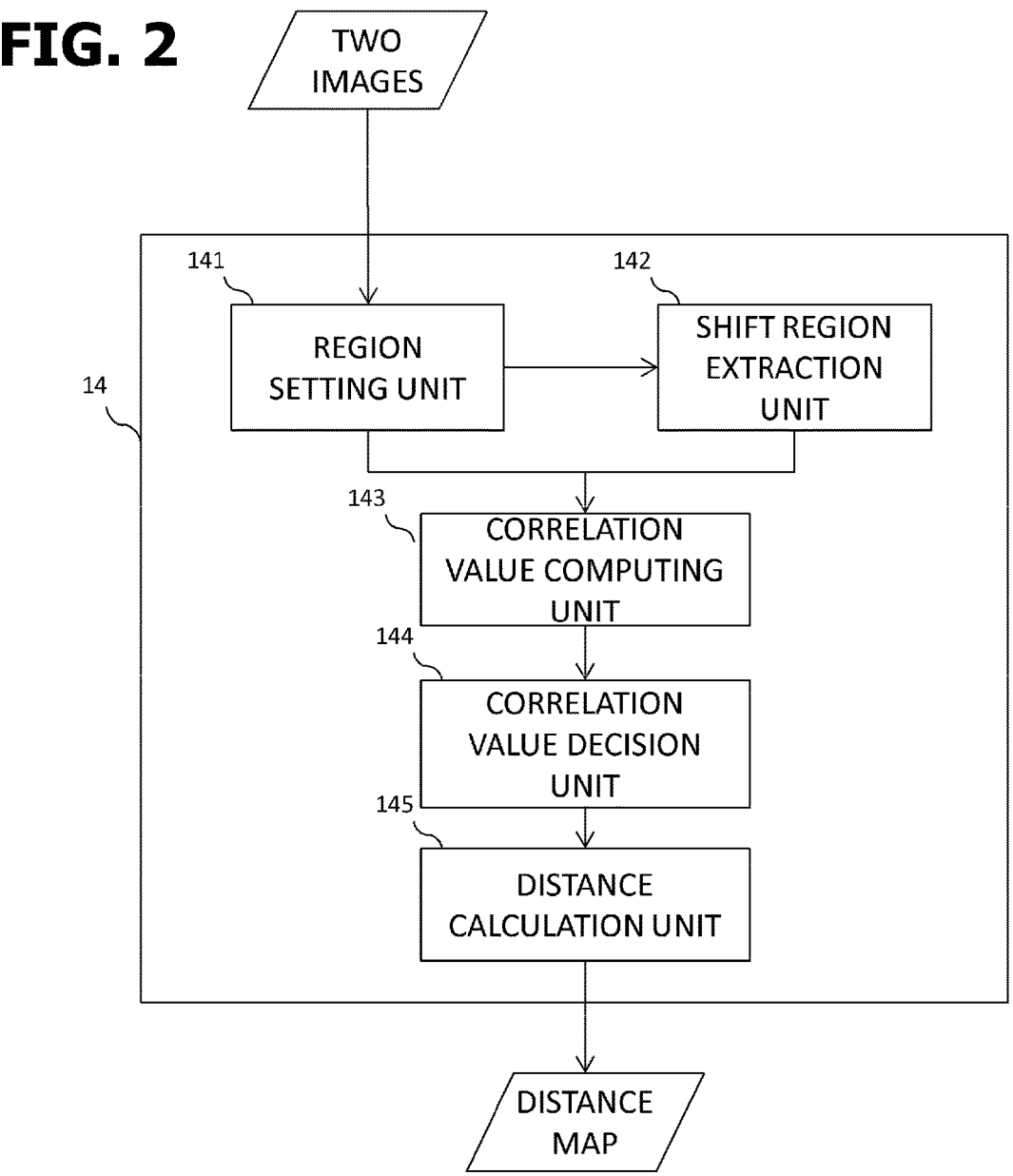
FIG. 2 is a detailed functional block diagram depicting a distance measurement unit according to an embodiment.

The distance measurement unit 14 has a function to calculate the distance to an object in the image in the depth direction. Details of the operation of the distance measurement will be described later. As illustrated in FIG. 2, the distance measurement unit 14 includes a region setting unit 141, a shift region extraction unit 142, a correlation value computing unit 143, a correlation value decision unit 144, and a distance calculation unit 145. Details of the operation of each functional component will be described later.

The input unit 16 is an interface that the user operates for inputting information to and changing the setting of the imaging apparatus 1. For example, a dial, a button, a switch, a touch panel, or the like, can be used.

The display unit 17 is a display unit constituted by a liquid crystal display, an organic EL display, or the like. The display unit 17 is used to check the composition, when image-capturing, of a view image-captured or a recorded image, and to display, for example, various setting screens and message information.

The storage unit 18 is a non-volatile storage medium to store image-captured image data, parameter data used for the imaging apparatus 1, or the like. For the storage unit 18, it is preferable to use a large capacity storage medium that allows reading and writing data at high-speed. For example, a flash memory can be suitably used.

<Object Distance Measurement Method>

Figure 3:
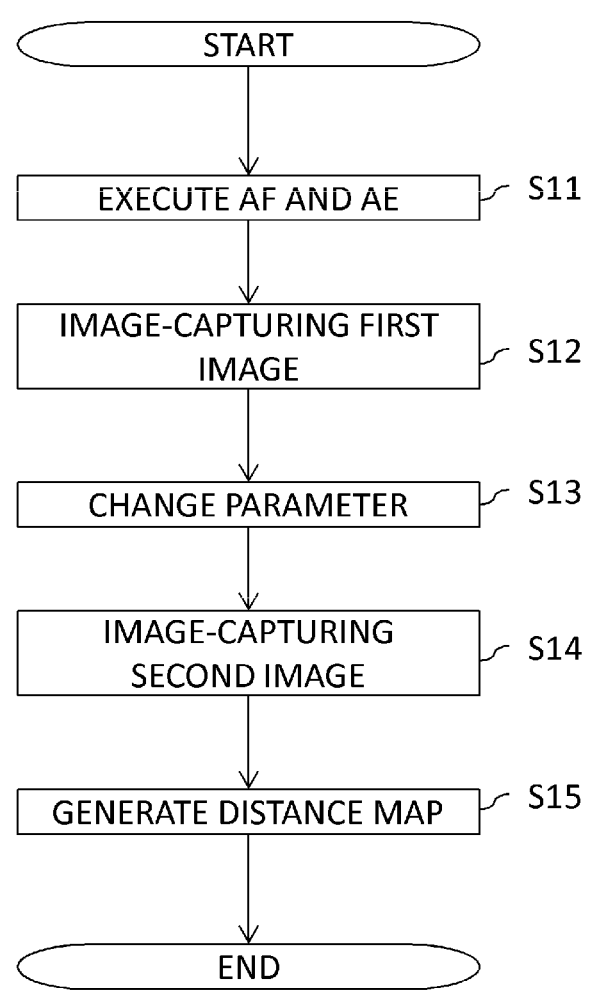
FIG. 3 is a flow chart depicting a flow of a distance measurement processing according to an embodiment.

Now the distance measurement processing performed by the imaging apparatus 1 will be described with reference to FIG. 3, which is a flow chart depicting the processing flow.

When the user instructs the execution of distance measurement by operating the input unit 16 and starts image-capturing, the control unit 12 executes auto focus (AF) and auto exposure control (AE), and determines the focus position and the diaphragm (F number) (step S11). Then, in step S12, image-capturing an initial image (first image) is executed, and the image is loaded from the image sensor 11. In this description, it is assumed that the imaging apparatus 1 automatically determines the image-capturing parameters, such as the focus position and the diaphragm, but the user may specify a portion of or all of these image-capturing parameters.

When image-capturing the first image completes, the control unit 12 changes the image-capturing parameters (step S13). The image-capturing parameters to be changed are at least one of: diagram (F number); focus position; and focal length. The image-capturing parameters may be changed according to a predetermined method or the image-capturing parameters may be changed based on the information that the user inputted via the input unit 16. When the change of the image-capturing parameters completes, the processing advances to step S14, where the next image (second image) is image-captured.

In this embodiment, the second image is image-captured while changing the focus position. For example, the first image is image-captured such that the main object is focused by auto focus, and the second image is image-captured while changing the focus position by a predetermined amount, so that the main object is blurred.

To measure the distance here at high-precision, it is preferable to make the shutter speed fast and the image-capturing interval short. This is because the influence of camera shake and object blur is decreased as the shutter speed is faster or as the image-capturing interval is shorter. If, however, the sensitivity is increased to increase the shutter speed, the influence of noise may increase more so than the influence of camera shake. Therefore, it is necessary to set an appropriate shutter speed considering sensitivity.

When the two images are image-captured, the image-captured images are processed by the signal processing unit 13, respectively, so as to be suitable images for distance measurement, and are temporarily stored in the memory 15. In concrete terms, development processing is performed, where it is preferable to prevent edge enhancement processing, or the like, so that blurs are not changed during signal processing. In the case of image-capturing color images, the image to be used for subsequent processing may be a signal-processed brightness image, or an image having one color of R, G, and B generated by performing de-mosaicing processing on data in a Bayer array, or selecting a pixel having a specific color. In this case, at least one of the image-captured images may be signal-processed as an ornamental image, and stored in the memory 15.

In step S15, the distance measurement unit 14 calculates a distance map from the two images for distance measurement that are stored in the memory 15. The distance map is data that indicates the distribution of the distance information on the object in the image. The distance information may be a distance from the imaging apparatus to the object, or a relative distance from the focus position to the object. The distance information may be an object distance or an image distance, and the degree of blur and the correlation amount may be directly used as the distance information. The calculated distribution of the object distance is displayed via the display unit 17, and is stored in the recording unit 19.

Figure 4:
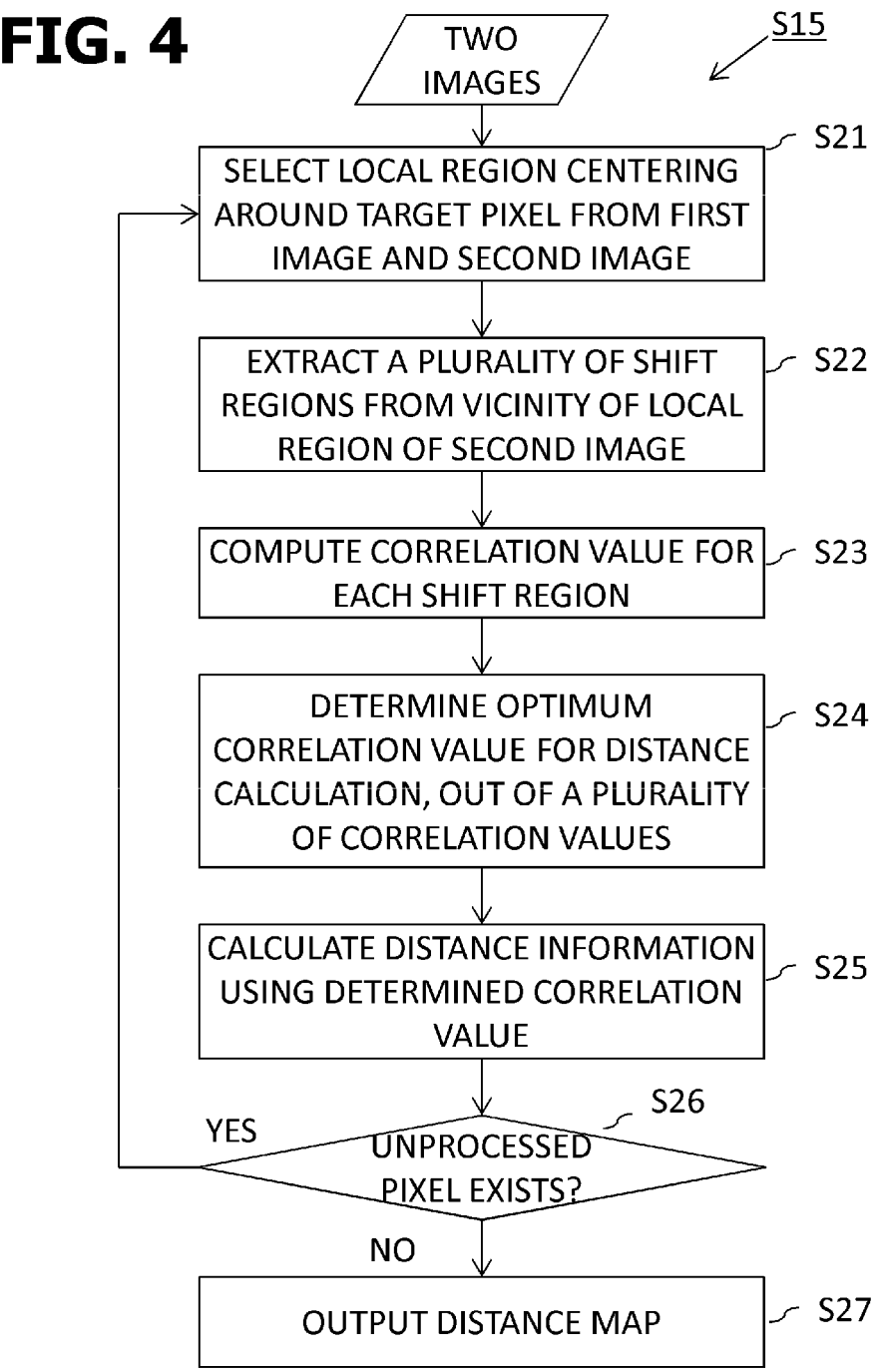
FIG. 4 is a flow chart depicting a distance map generation processing according to Embodiment 1.

Now, the processing that the distance measurement unit 14 performs in step S15 (hereafter, called "distance map generation processing") will be described with reference to FIG. 2 and FIG. 4. FIG. 2 is a function block diagram depicting the distance measurement unit 14. FIG. 4 is a flow chart depicting a distance map generation processing according to Embodiment 1.

When two images having different focus positions (first image and second image) are inputted, the region setting unit 141 sets and selects a local region centering around a same coordinate position (distance calculation target pixel position) in the inputted two images in a region setting step S21. In concrete terms, a local region around the same coordinate pixel in the inputted two images is extracted from the first image and the second image, respectively. The two images were consecutively shot at high speed, and the positions thereof approximately match with each other. This, however, does not mean that they perfectly match with each other, because positional displacement may have been generated if the local regions having the same coordinate positions are set respectively. Therefore, if the local regions having the same coordinate positions are set in each image, it means that approximately the same scenes are set in the respective images. The local region is a region centering around the distance calculation target pixel having a predetermined size.

By repeating the region selection processing in step S21 and the subsequent processing operations in steps S22 to S25, while shifting the distance calculation target pixel by one pixel at a time, the distance image of the entire input image (distance map) can be calculated. The distance map, however, need not always be calculated for the entire input image, but only a pixel group in a part of the input image may be the distance calculation target region. For example, the distance may be calculated at every several pixels in the input image, or the distance may be calculated only for a partial region in the input image. The user may specify, for example, the resolution of the distance map and the region, for which distance is calculated, via the input unit 16.

Figure 5A:
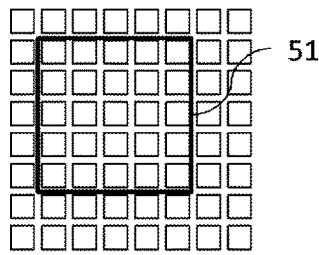
FIG. 5A and FIG. 5B are diagrams depicting shift regions according to Embodiment 1.
Figure 5B:
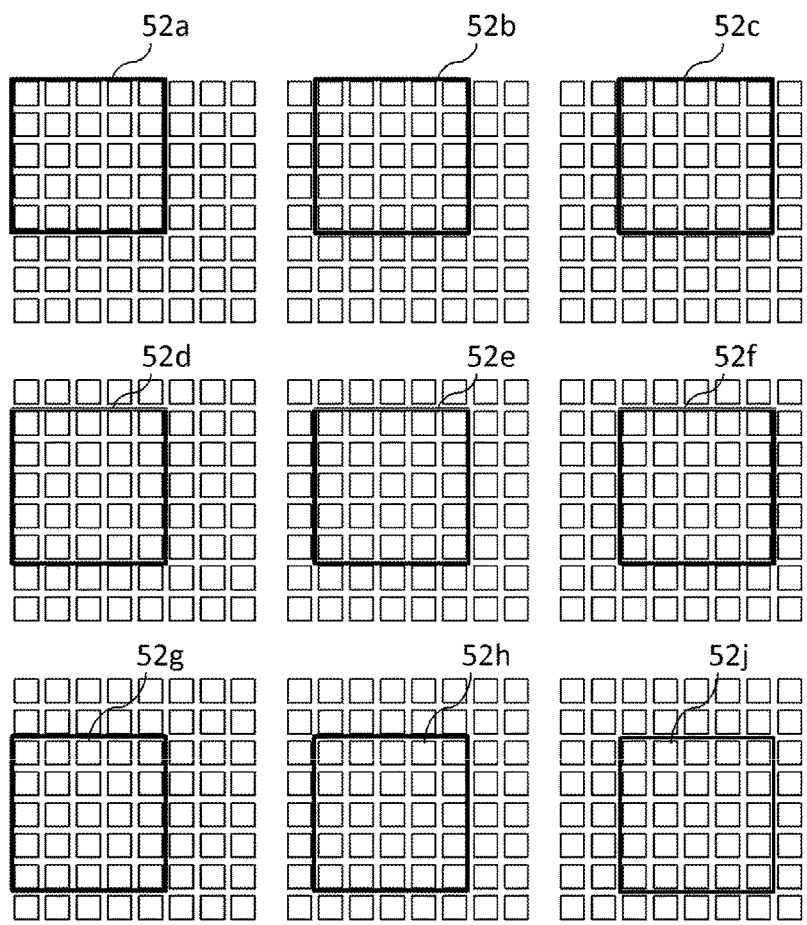

In a region extraction step S22, the shift region extraction unit 142 extracts a plurality of same-sized regions (hereafter, called "shift region") from a predetermined range around the local region that is set for the second image. The predetermined range around the local region can be, for example, a region of which shift amount, from the local region that is set for the second image, is within a predetermined range. In the following description, a predetermined range where the shift amount is one pixel or less is considered. For example, a case is considered when the region 51, indicated by the bold frame in FIG. 5A, is selected as a local region in the first image in step S21. In this case, a region 52e shown in FIG. 5B is selected as the local region in the second image corresponding to the region 51. Then, the regions 52a to 52j located in a range that is shifted from the region 52e by one pixel are selected as the shift regions. The region 52e itself is also included in the shift region.

The shift regions are extracted from a range around the region 52e (in this example, a range shifted from the region 52e by one pixel) because the direction of displacement is unknown, even if it is assumed that at least one pixel of positional displacement remains. As shown in FIG. 5B, a total of nine shift images, generated by shifting the region 52e in eight directions (up, down, left, right and in four diagonal directions) by one pixel, respectively, are extracted. It is assumed that there is a region corresponding to the local region 51 of the first image among these nine shift regions. The shift amount depends on the shutter speed, the object motion, and the motion of the imaging apparatus. Therefore, it is preferable to set the shift amount considering these conditions. The shift amount may be a value fixed in advance, or may be specified by the user via the input unit 16.

It is preferable that the shift amount has a value less than the length of one side of the local region (region 51) that was set in the region setting step (four pixels or less in FIG. 5B). Considering the remaining positional displacement amount and the computing volume, it is preferable to shift the local region in up, down, left, and right directions by one pixel or two pixels, respectively.

Then, in correlation value computing step S23, the correlation value computing unit (first calculation unit) 143 uses Expression 1 and calculates the correlation value NCCj between the extracted local region (region 51) of the first image and the plurality of shift regions (regions 52a to 52j) extracted from the second image. I1 denotes an average value of the brightness of the pixels in the local region of the first image, and I2 denotes an average value of the brightness of the pixels in the local region of the second image. The subscript i denotes a position of the pixel in the local region, and the subscript j denotes the number of the local regions in the entire image.

[Math. 1]

$$NCC_j = \frac{\sum (I_{1,i} - \overline{I_1})(I_{2,i} - \overline{I_2})}{\sqrt{\sum (I_{1,i} - \overline{I_1})^2 \sum (I_{2,i} - \overline{I_2})^2}} \quad \text{(Expression 1)}$$

If there are no aberrations, and the degrees of blur in the two images generated by defocusing are the same before and after focusing, then the degrees of blur in the two images becomes the same at the center of the two focus positions on the image side when image-capturing with a moving focus, and correlation of the two images is highest in this position. The more distant from this intermediate position, the more different the degrees of blur of the two images become, and correlation thereof decreases. In other words, correlation decreases as the position is more distant from the position where the degrees of blur of the two images are the same. The correlation value is a value in accordance with the blur generated by defocusing. Hence, if the correlation value is known, then the corresponding defocus amount can be known, and the relative distance can be calculated.

In an optimum value determination step S24, the correlation decision unit (first decision unit) 144 determines an optimum correlation value for calculating the distance information of the distance calculation target pixel from the plurality of correlation values calculated in the correlation computing step S23. Correlation between local images drops considerably if positional displacement is generated between the images. When a plurality of shift regions are extracted from the second image with shifting positions, the shift region, of which correlation is highest, becomes a local region of which position matches with the local region 51 of the first image, if the positional displacement between the two images is within the shift range. Therefore, according to this embodiment, a correlation value having the highest correlation, among the correlation values calculated in the correlation computing step S23, is outputted as the optimum correlation value, which is used for the distance calculation.

Then, in a distance calculation step S25, the distance calculation unit (second calculation unit) 145 calculates the distance information on the distance calculation target pixel based on the optimum correlation value. The acquired optimum correlation value may be directly outputted as the distance information, or may be outputted as the relative position from the focus position on the image plane. The correlation value and the relative position from the focus position on the image plane are different depending on the F number. Hence, a conversion table may be provided for each F number, whereby the optimum correlation value may be converted into the relative distance from the focus position on the image plane. Furthermore, the acquired relative distance may be converted into the object distance using the focal length and the focus distance on the object side, and the object distance may be outputted.

Moreover, the displacement amount between the local image of the second image where the correlation value is the highest and the local region that is set in the first region, may also be outputted as the residual positional displacement amount. For example, if the correlation value of the region 52a is highest in FIG. 5B, (−1, −1) is outputted as the residual positional displacement amount. The residual positional displacement amount can also be used for other image processing operations, such as image synthesis.

According to this embodiment, a plurality of regions, for which a correlation value is computed for the distance calculation, is selected, and an optimum value is calculated from the obtained values, even if positional displacement remains between the two images. Therefore, the distance information where positions are aligned in pixel units can be calculated. Positional alignment to accurately correct positional displacement generates an enormous calculation load, but in the case of this embodiment, the distance information can be calculated using the region that is aligned in the distance information calculation, even if the positions of the images are displaced.

Embodiment 2

Embodiment 2 of the present invention will be described next. The differences of Embodiment 2 from Embodiment 1 are: the image-capturing parameter that is changed is not a focus position, but an F number; and the method of calculating the optimum correlation value. Further, a processing for aligning the positions of the two images is also executed. The configuration of the imaging apparatus 1, which is the same as Embodiment 1, will be described using the same reference symbols.

Now, the processing operations that are different from those in Embodiment 1 will be described. FIG. 6 is a flow chart depicting a flow of a distance map generation processing according to Embodiment 2.

In Embodiment 2, the F number is changed when the image-capturing parameter is changed, in step S13. In other words, two images having different F numbers are acquired by executing step S14.

The distance map generation processing operations 15 will be described next with reference to FIG. 6.

A positional alignment step S31 is a step of performing processing to align the positions of two images (hereafter, called "positional alignment processing"). When the image-capturing interval between the two images is long and a camera shake or an object motion is generated, this processing is required to align the positions of the images to some extent. The positional alignment can be performed by a known method (e.g., positional alignment processing for electronic vibration isolation or HDR image-capturing), and need not be a processing exclusively used for distance measurement. The positional alignment processing may be executed by the signal processing unit 13, or may be executed by the distance measurement unit 14.

As a typical positional alignment method, a motion vector (motion information) between the images is calculated first, and a coordinate transformation coefficient, such as an affine transformation, is calculated using this motion vector. Then, based on the calculated transformation coefficient, one image is transformed to align positions. In this positional alignment, motion of the imaging apparatus and motion that occurred most in the images can be corrected, and images of which positions are aligned in most of the regions are generated.

Thus, in the positional alignment processing, there is no need to perfectly align positions in pixel units. The above mentioned processing based on coordinate transformation is suitable, since the processing load becomes enormous and real-time processing becomes difficult in the imaging apparatus if positions are aligned in pixel units.

The processing operations in steps S32 to S34 are the same as the processing operations in steps S21 to S23 in Embodiment 1. Hence, a description thereof is omitted. For the displacment amount of the local region in step S33, however, it is preferable to set a value according to the positional alignment performance in step S31, and it is also possible to set a different displacement amount for each region of the image according to the reliability of the positional alignment, or the like. In other words, it is preferable that the distance measurement unit 14 performs a range determination processing (second determination processing) to determine a predetermined range from which the shift region is extracted, according to the reliability of the positional alignment. For example, in the positional alignment processing, it is estimated that positional displacement is small in the pixels around a motion vector that was used for calculating the transformation coefficient, and positional displacement is large in the pixels around a motion vector that was not used. Therefore, in the range determination processing, it is preferable to set a low value for the predetermined range from which the shift region is extracted, by decreasing the shift amount of the region that is estimated that the positional displacement thereof is small, based on the information acquired at positional alignment (e.g., motion information). It is also preferable to set a high value for the predetermined range from which the shift region is extracted, by increasing the shift amount of the region that is estimated that the positional displacement thereof is large.

Then, in step S35, a position of a shift region, which most closely matches with the local region of the first image (shift region that indicates the highest correlation value), is determined in sub-pixel accuracy, from a plurality of correlation values calculated in step S34 and the shift amount of the local region. Sub-pixel here refers to a unit that exceeds pixel resolution. The positional displacement of the object in the image is in pixel units because of sampling, but it is not actually in pixel units. Therefore, distance measurement with higher accuracy becomes possible by aligning the positions in sub-pixel accuracy. The position of the shift region, which most closely matches with the local region of the first image, is determined by calculating the center of gravity position of the correlation value, as shown in Expression 2. This is a position where the positions of the local regions of the two images most closely match when it is assumed that the change of correlation value, due to the positional displacement, is linear.

[Math. 2]

$$x_c = \frac{\sum C_i x_i}{\sum C_i}, \; y_c = \frac{\sum C_i y_i}{\sum C_i} \quad \text{Expression 2}$$

Figures 7A, 7B, 7C:
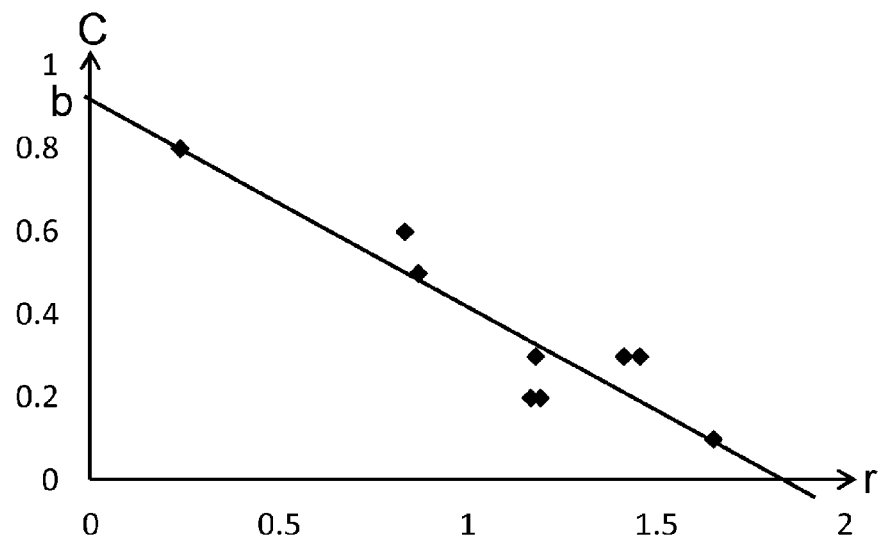
FIG. 7A to FIG. 7C are diagrams depicting a correlation value determination processing at sub-pixel accuracy according to Embodiment 2.

Here, C denotes a correlation value, and x and y denote the pixel shift amount of each shift region. The subscript i indicates a position of each pixel in the shift region. If the pixel is shifted, as illustrated in FIG. 5, x and y correspond to −1, 0, or +1, respectively. For example, it is assumed that the correlation values shown in FIG. 7A are acquired for the nine shift regions shown in FIG. 5B. In this case, FIG. 7B shows the coordinate values of each shift region. In other words, Expression 2 is used to determine weighted mean values of the x coordinate and the y coordinate of each shift region when the correlation value C is the weight. In the case of FIG. 7A, (0.18, −0.15) are determined as the coordinates of the center of gravity.

As shown in FIG. 7C, the correlation value is assumed to be a linear function of the distance r (shift amount) between the center of gravity position ($x_c$, $y_c$) and the center position of each shift region. Therefore, the correlation values are fitted into the linear function C=ar+b based on the center coordinate positions and the coordinate values of the nine shift regions using the least squares method, whereby the correlation value at the center of gravity positions is estimated.

For this, the distance r from the center of gravity position (xc, yc) to the pixel shift position is calculated first using Expression 3.

[Math. 3]

$$r_i = \sqrt{(x_i - x_c)^2 + (y_i - y_c)^2} \quad \text{Expression 3}$$

Then, the coefficients a and b of the linear function are calculated by the least squares method. The position of the distance zero is the center of gravity position, and the correlation value of the center of gravity position can be determined by b alone. Hence, only the coefficient b may be determined without determining the coefficient a. The coefficient b is calculated by Expression 4 shown below. This value b is the highest correlation value C. In the example in FIG. 7, the highest correlation value 0.91 is acquired at the center of gravity position (0.18, −0.15).

[Math. 4]

$$b = \frac{\sum_{i=1}^{n} r_i^2 \sum_{i=1}^{n} C_i - \sum_{i=1}^{n} r_i C_i \sum_{i=1}^{n} r_i}{n \sum_{i=1}^{n} r_i^2 - \left(\sum_{i=1}^{n} r_i\right)^2} \quad \text{Expression 4}$$

Here, n denotes a number of shift regions.

The positional alignment may be executed by the distance measurement unit 14, or the signal processing unit 13 may execute positional alignment and input the aligned two images to the distance measurement unit 14. In this embodiment, the linear function is used for calculating the correlation value at a sub-pixel position, but fitting may be performed using a different polynomial.

According to this embodiment, positional alignment between the two images is executed. Therefore, distance measurement can be executed even if positional displacement is generated due to camera shake or object motion during consecutive image-capturing. Furthermore, correlation values, when the positions are aligned in sub-pixel units, can be estimated, which makes it possible to measure distance at higher accuracy.

Embodiment 3

In Embodiment 3, two green brightness images, generated by independently sampling two green pixels in a Bayer array, are used as the processing target input images. The configuration of the imaging apparatus 1 according to Embodiment 3 is the same as that in Embodiment 1.

In a picture element having a Bayer array, a plurality of pixel blocks constituted by four pixels (first green pixel, second green pixel, red pixel, and blue pixel) is disposed. Here, an image acquired from the first green pixels is called a "G1 image", and an image acquired by the second green pixels is called a "G2 image". Further, a G1 image in the first image is called a "first G1 image", and a G1 image in the second image is called a "second G1 image". In this manner, a G2 image in the first image is called a "first G2 image", and a G2 image in the second image is called a "second G2 image".

Now, processing operations that are different from those in Embodiment 1 will be described. FIG. 8 is a flow chart depicting a flow of a distance map generation processing according to Embodiment 3.

Figure 9A:
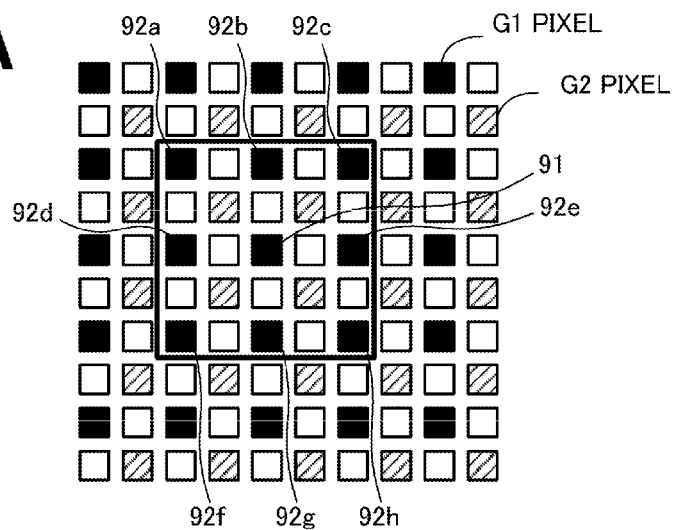
FIG. 9A and FIG. 9B are diagrams depicting shift regions of an image acquired by a second green pixels (G2) image according to Embodiment 3.

A first G1 image, a second G1 image, and a G2 image are inputted to the distance measurement unit 14. Preferably, the characteristics of the color filters in the two green pixels are the same. If the images are inputted, a position of a shift region that indicates a highest correlation value is determined in step S41 using the first G1 image and the second G1 image. The processing in step S41 is the same as the processing operations in steps S21 to S24 of Embodiment 1. This processing will be described with reference to FIG. 9A. FIG. 9A shows a picture element having a Bayer array, where a pixel filled in black is the first green pixel (G1 pixel), and a pixel diagonally hatched is the second green pixel (G2 pixel). Here, it is assumed that the G1 pixel 91 is selected as the distance measurement target pixel. In this case, just like Embodiment 1, the correlation value is calculated for a total of nine shift regions: a local region centering around the G1 pixel 91 in the second G1 image; and the local regions centering around the G1 pixels 92a to

92*h*. Then, a shift region of which a correlation value is highest is determined among these nine shift regions. Here, it is assumed that a highest correlation value was acquired in the local region centering around the second G1 pixel 91.

Figure 9B:
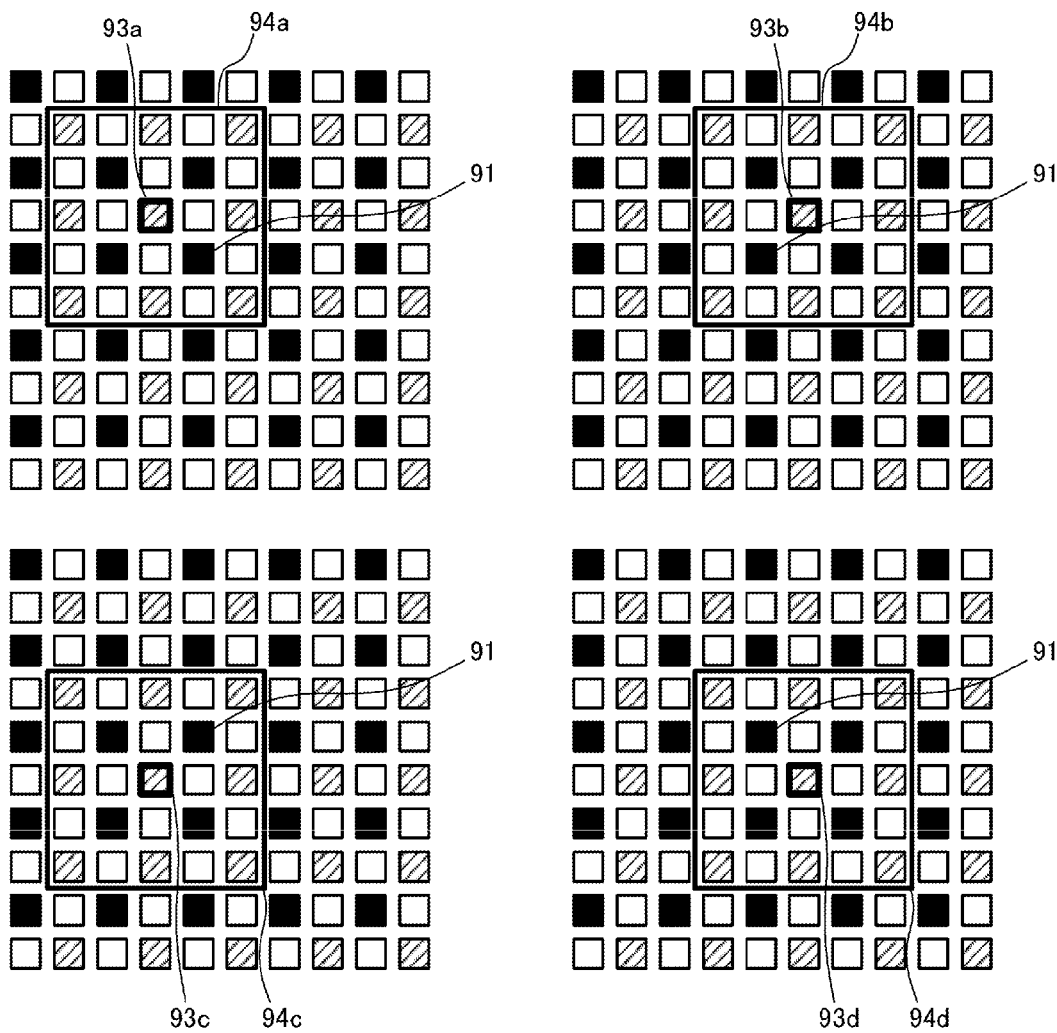

Once the local region that indicates the highest correlation value is determined by comparing the first G1 image and the second G1 image, a shift region extraction unit 142 extracts a plurality of shift regions in the vicinity of this local region from the second G2 image in step S42. Here, the vicinity range is assumed to be one pixel range from the local region. As shown in FIG. 9B, there are four G2 pixels in one pixel range from the G1 pixel 91 (93*a* to 93*d*). Therefore, the four shift regions 94*a* to 94*d*, centering around these G2 pixels, are extracted in step S42.

Then, in step S43, a correlation value computing unit 143 calculates the correlation values between the local region of the first G1 image and the shift regions 94*a* to 94*d* extracted in step S42. In step S44, the correlation value decision unit 144 determines the highest correlation value of the correlation values of five shift regions (shift region 91 and shift regions 94*a* to 94*d*), as a correlation value that is appropriate for distance calculation use. In step S45, a distance calculation unit 145 calculates a distance at the distance calculation target pixel using the correlation value determined in step S44.

The distance map is acquired by repeating the processing mentioned above for all of the distance calculation target pixels. The distance measurement unit 14 outputs the completed distance map (S47). At this time, it is preferable to output the positional displacement amount of the shift region that indicates the highest correlation value as the residual positional displacement amount, just like Embodiment 1.

When the optimum value calculation in step S44 is executed a second time, the center of gravity position estimation and the correlation value estimation at the center of gravity position may be executed as in the case of Embodiment 2, using all of or a portion of the calculated correlation values.

According to this embodiment, when the distance is measured using a green brightness image generated by one green pixel of a Bayer array, the other green brightness image is used so as to calculate distance information, where positions are aligned at sub-pixel accuracy. Moreover, by using the green brightness images acquired from the Bayer array, distance information can be acquired using images where blur is not changed by the signal processing.

Embodiment 4

Embodiment 4 is used when the input image is a RAW image in a Bayer array. The configuration of an imaging apparatus 1 according to Embodiment 4 is the same as in Embodiments 1 to 3.

Now, processing operations that are different from Embodiment 1 and Embodiment 3 will be described. FIG. 10 is a flow chart depicting a flow of a distance map generation processing according to Embodiment 4. A first image and a second image, which are RAW images in a Bayer array, are inputted to the distance measurement unit 14.

The processing operations in steps S51 to S54 are the same as those in Embodiment 3. In this embodiment, as well as in Embodiment 3, if an image is inputted, the region is set using one green pixel (G1 pixel) of the first image, and one green pixel (G1 pixel) of the second image as the distance calculation target pixels. Then, in step S51, a local region that indicates the highest correlation value is determined out of the nine shift regions (see FIG. 5B) constituted by G1 pixels.

Then, in step S52, shift regions constituted by four second G2 pixels, centering around the shift region image at the G1 pixel of the second image from which the highest correlation value is outputted, is extracted again, as shown in FIG. 9B. Then, in step S53, the correlation values are calculated from the four shift region of the four second G2 images. In the case of examples in FIG. 5 and FIG. 9, correlation values of a total of thirteen shift regions have been calculated thus far.

In step S54, a position that indicates the highest correlation value (shift amount) is determined at sub-pixel accuracy based on the correlation values of the thirteen shift regions discussed above. Then, in step S55, the relationship between the shift amount and the correlation value is determined, and the highest correlation value is estimated. The processing operations in steps S54 and S55 are essentially the same as the processing operations (step S35 and S36) described in Embodiment 2. The highest correlation value estimated in this way is determined as the optimum correlation value to be used for the distance calculation. At this time, there is no need to use all of the correlation values calculated in step S53, but only the correlation values not less than a threshold may be used. Alternatively, the upper five values of the correlation values may be used. In step S56, the distance calculation unit 145 calculates the distance at the distance calculation target pixel using the correlation values determined in step S55.

The distance map is acquired by repeating the above-mentioned processing for all of the distance calculation target pixels. The distance measurement unit 14 outputs the completed distance map (S58). At this time, it is preferable to output the shift amount of the position that indicates the highest correlation value (center of gravity position) as the residual positional displacement amount.

According to this embodiment, an optimum correlation value is calculated first. Then, a plurality of local regions centering around the local region having the optimum correlation value is extracted, and a plurality of correlation values thereof is calculated again, so that the correlation values, when the positions of the images are aligned at sub-pixel accuracy, can be estimated. Since the accuracy of calculating the correlation values improves, the distance calculation accuracy improves. Furthermore, processing can be simplified, since the image in the Bayer array can be directly processed without generating a new green brightness image from the image in the Bayer array.

In this embodiment, the RAW image in the Bayer array is inputted, but a similar processing may be performed using only the values at G1 and G2 pixel positions, inputting the brightness image after YUV conversion.

<Modification>

Examples of each embodiment are used merely for describing the present invention, and the present invention can be carried out by changing or combining the above embodiments within a scope that does not depart from the spirit of the invention. For example, the present invention may be carried out as an imaging apparatus that includes at least a part of the above processing operations, or may be carried out as a distance measurement apparatus that does not include an imaging unit. The present invention may also be carried out as a distance measurement method, or as an image processing program to allow a distance measurement apparatus to execute the distance measurement method. The above mentioned processing operations and units may be freely combined as long as no technical inconsistency is created.

Each elemental technology described in the embodiments may be arbitrarily combined. For example, the image-capturing parameter to be changed, whether estimation is performed at a sub-pixel position or not, whether positional alignment is performed or not, or the like, may be freely combined.

In the description of the embodiments, the vicinity range where the shift regions are extracted is a maximum one pixel range, but the vicinity range may also be two or more pixels from the target pixel.

In the description of the embodiments, the imaging apparatus acquires two images, but three or more images may be acquired. In this case, two images are selected from the image-captured images, and the distance is measured using these two images. If three or more images are acquired, the range where distance can be measured becomes wider, and distance accuracy improves.

Other Embodiments

The distance measurement technology of the present invention discussed above can be suitably applied to imaging apparatuses, such as a digital camera and a digital camcorder, or to image processors and computers that perform image processing on the image data acquired by an imaging apparatus. The present invention can also be applied to various electronic devices that house such an imaging apparatus or image processor, (including a portable phone, a smartphone, a slate terminal, and a personal computer).

In the description of the embodiments, the distance measurement function is included in the imaging apparatus main unit, but distance measurement may be performed outside of the imaging apparatus. For example, the distance measurement function may be included in a computer having an imaging apparatus, so that the computer acquires images image-captured by the imaging apparatus, and calculates the distance. Alternatively, the distance measurement function may be included in a computer that can access a network via a cable or radio, so that the computer acquires a plurality of images via the network, and measures the distance.

The acquired distance information can be used for various image processing operations, such as dividing an area of an image, generating a 3D image or a depth image, and emulating a blur effect.

The distance measurement function may be installed in the apparatus either by software (program) or by hardware. For example, a program is stored in a memory of a computer (e.g., a microcomputer, FPGA) housed in an imaging apparatus or an image processor, and the computer executes the program, whereby various processing operations to achieve the object of the present invention are implemented. It is also preferable to install a dedicated processor, such as an application specific integrated circuit (ASIC), that implements all of or a part of the processing operations of the present invention by logic circuits.

For this object, the program is provided to a computer via a network, or by various types of recording media that can be the above mentioned storage device (that is, computer readable recording media that non-transitorily holds data). Therefore, the computer (including such devices as a CPU and an MPU), the method, the program (including program codes and program products), and computer readable recording media that non-temporarily holds the program are all included in the scope of the invention.

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or an apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)), and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™ a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A distance measurement apparatus that calculates distance information from a first image and a second image that are image-captured with different image-capturing parameters, the distance measurement apparatus comprising:
at least one processor operatively coupled to a memory, serving as:
(i) a setting unit configured to set a first local region located in the first image and including a distance calculation target pixel, and a second local region located in the second image and corresponding to the first local region;
(ii) an extraction unit configured to extract a plurality of shift regions, which are regions of which a shift amount from the second local region is within a predetermined range;
(iii) a first calculation unit configured to calculate a correlation value between the first local region and each of the plurality of shift regions;
(iv) a first decision unit configured to determine a correlation value used for calculating the distance information, based on the plurality of correlation values calculated by the first calculation unit; and
(v) a second calculation unit configured to calculate the distance information on the distance calculation target pixel, based on the correlation value determined by the first decision unit.

2. The distance measurement apparatus according to claim 1, wherein the first decision unit determines a highest correlation value from among the plurality of correlation values as a correlation value used for calculating the distance information.

3. The distance measurement apparatus according to claim 1, wherein the first decision unit determines the correlation value used for the distance calculation, based on positions of the plurality of shift regions and a plurality of correlation values corresponding to the plurality of shift regions.

4. The distance measurement apparatus according to claim 3, wherein the first decision unit estimates a position of a local region in the second image where the correlation value with the first local region is the highest, and determines the correlation value estimated in this position as a correlation value used for the distance calculation.

5. The distance measurement apparatus according to claim 1, further comprising a second decision unit configured to determine a size of the predetermined range.

6. The distance measurement apparatus according to claim 5, further comprising an alignment unit configured to perform coordinate transformation on the second image, based on motion information on motion between the first image and the second image so as to implement alignment with the first image, wherein the second decision unit determines the size of the predetermined range based on the motion information on each local region.

7. The distance measurement apparatus according to claim 1, wherein a displacement amount between the shift region, where the highest correlation value is acquired out of the plurality of shift regions, and the first local region is outputted as a residual positional displacement amount.

8. The distance measurement apparatus according to claim 1, wherein a first green brightness image acquired from a first green pixel in an image, acquired by an image sensor having a Bayer array, in which a plurality of pixel blocks constituted by a first green pixel, a second green pixel, a red pixel and a blue pixel is disposed, is used as the first image and the second image.

9. The distance measurement apparatus according to claim 1, wherein:
a first green brightness image acquired from a first green pixel of an image, acquired by an image sensor having a Bayer array, in which a plurality of pixel blocks constituted by a first green pixel, a second green pixel, a red pixel, and a blue pixel is disposed, is used as the first image, and
the first green brightness image acquired from the first green pixels and a second green brightness image acquired from the second green pixel of an image, acquired by the image sensor having a Bayer array, are used as the second image.

10. The distance measurement apparatus according to claim 9, wherein:
the setting unit sets a second local region corresponding to the first local region, using the first green brightness image as the second image,
the extraction unit extracts a plurality of shift regions, which are regions of which a shift amount from the second local region is within a predetermined range,
the first calculation unit calculates the correlation value for the plurality of shift regions in the first green brightness image, and determines a shift region from which the highest correlation value is acquired,
the extraction unit extracts a plurality of shift regions in the second green brightness image, which are regions of which a shift amount from the shift region where the highest correlation value has been acquired in the first green brightness image, is within a predetermined range, using the second green brightness image as the second image,
the first calculation unit determines the correlation value for the plurality of shift regions in the second green brightness image, and
the first decision unit determines a correlation value that is used for distance calculation, based on the plurality of correlation values calculated using the first green brightness image and the second green brightness image.

11. The distance measurement apparatus according to claim 10, wherein the first decision unit determines the highest correlation value from among the plurality of correlation values calculated using the first green brightness image and the second green brightness image, as a correlation value used for distance calculation.

12. The distance measurement apparatus according to claim 10, wherein the first decision unit determines the correlation value used for distance calculation, based on the plurality of correlation values and the positions of the shift regions used for calculating the correlation values.

13. The distance measurement apparatus according to claim 12, wherein the first decision unit estimates a position of a region, of which a correlation value with the first local region is highest, in the second image, and determines the correlation value estimated in this position as the correlation value used for the distance calculation.

14. An imaging apparatus comprising:
an imaging unit; and
the distance measurement apparatus according to claim 1.

15. A distance measurement method for calculating distance information from a first image and a second image that are image-captured with different image-capturing parameters, the method comprising:
a setting step of setting a first local region located in the first image including a distance calculation target pixel, and a second local region located in the second image corresponding to the first local region;
an extraction step of extracting a plurality of shift regions, which are regions of which a shift amount from the second local region is within a predetermined range;
a first calculation step of calculating a correlation value between the first local region and each of the plurality of shift regions;
a decision step of determining a correlation value used for calculating distance information, based on the plurality of correlation values calculated in the first calculation step; and
a second calculation step of calculating the distance information on the distance calculation target pixel, based on the correlation value determined in the decision step.

16. A non-transitory computer-readable medium that stores a program to allow a computer to execute each of the steps in the distance measurement method according to claim 15.

17. A distance measurement apparatus that calculates distance information from a first image and a second image that are image-captured with different image-capturing parameters, the distance measurement apparatus comprising:
an image processing apparatus operatively coupled to an application specific integrated circuit, serving as:
(i) a setting unit configured to set a first local region located in the first image and including a distance calculation target pixel, and a second local region located in the second image and corresponding to the first local region;

(ii) an extraction unit configured to extract a plurality of shift regions, which are regions of which a shift amount from the second local region is within a predetermined range;

(iii) a first calculation unit configured to calculate a correlation value between the first local region and each of the plurality of shift regions;

(iv) a first decision unit configured to determine a correlation value used for calculating the distance information, based on the plurality of correlation values calculated by the first calculation unit; and (v) a second calculation unit configured to calculate the distance information on the distance calculation target pixel, based on the correlation value determined by the first decision unit.

18. The distance measurement apparatus according to claim 17, wherein the first decision unit determines a highest correlation value from among the plurality of correlation values as a correlation value used for calculating the distance information.

19. The distance measurement apparatus according to claim 17, wherein the first decision unit determines the correlation value used for the distance calculation, based on positions of the plurality of shift regions and a plurality of correlation values corresponding to the plurality of shift regions.

20. The distance measurement apparatus according to claim 19, wherein the first decision unit estimates a position of a local region in the second image where the correlation value with the first local region is the highest, and determines the correlation value estimated in this position as a correlation value used for the distance calculation.

21. The distance measurement apparatus according to claim 17, further comprising a second decision unit configured to determine a size of the predetermined range.

22. The distance measurement apparatus according to claim 21, further comprising an alignment unit configured to perform coordinate transformation on the second image, based on motion information on motion between the first image and the second image so as to implement alignment with the first image, wherein the second decision unit determines the size of the predetermined range based on the motion information on each local region.

23. The distance measurement apparatus according to claim 17, wherein a displacement amount between the shift region, where the highest correlation value is acquired out of the plurality of shift regions, and the first local region is outputted as a residual positional displacement amount.

24. The distance measurement apparatus according to claim 17, wherein a first green brightness image acquired from a first green pixel in an image, acquired by an image sensor having a Bayer array, in which a plurality of pixel blocks constituted by a first green pixel, a second green pixel, a red pixel, and a blue pixel is disposed, is used as the first image and the second image.

25. The distance measurement apparatus according to claim 17, wherein:

a first green brightness image acquired from a first green pixel of an image, acquired by an image sensor having a Bayer array, in which a plurality of pixel blocks constituted by a first green pixel, a second green pixel, a red pixel, and a blue pixel is disposed, is used as the first image, and the first green brightness image acquired from the first green pixels and a second green brightness image acquired from the second green pixel of an image, acquired by the image sensor having a Bayer array, are used as the second image.

26. The distance measurement apparatus according to claim 25, wherein:

the setting unit sets a second local region corresponding to the first local region, using the first green brightness image as the second image, the extraction unit extracts a plurality of shift regions, which are regions of which a shift amount from the second local region is within a predetermined range, the first calculation unit calculates the correlation value for the plurality of shift regions in the first green brightness image, and determines a shift region from which the highest correlation value is acquired, the extraction unit extracts a plurality of shift regions in the second green brightness image, which are regions of which a shift amount from the shift region where the highest correlation value has been acquired in the first green brightness image, is within a predetermined range, using the second green brightness image as the second image, the first calculation unit determines the correlation value for the plurality of shift regions in the second green brightness image, and the first decision unit determines a correlation value that is used for distance calculation, based on the plurality of correlation values calculated using the first green brightness image and the second green brightness image.

27. The distance measurement apparatus according to claim 26, wherein the first decision unit determines the highest correlation value from among the plurality of correlation values calculated using the first green brightness image and the second green brightness image, as a correlation value used for distance calculation.

28. The distance measurement apparatus according to claim 26, wherein the first decision unit determines the correlation value used for distance calculation, based on the plurality of correlation values and the positions of the shift regions used for calculating the correlation values.

29. The distance measurement apparatus according to claim 28, wherein the first decision unit estimates a position of a region, of which a correlation value with the first local region is highest, in the second image, and determines the correlation value estimated in this position as the correlation value used for the distance calculation.

* * * * *